Patented Apr. 9, 1946

2,397,925

UNITED STATES PATENT OFFICE 2,397,925

CONVERSION OF PARAFFIN HYDROCARBONS

Paul L. Cramer, Highland Park, and Charles R. Begeman, Grosse Pointe Woods, Mich., assignors to General Motors Corporation, Detroit, Mich., a corporation of Delaware No Drawing. Application October 7, 1943, Serial No. 505,350

11 Claims. (Cl. 260—683.5)

This invention has to do with the conversion of paraffin hydrocarbons.

It has been proposed heretofore to react aluminum halide with paraffin hydrocarbons in the presence of a halogen acid as a promoter. The two important reactions of aluminum halides with paraffin hydrocarbons containing more than four carbon atoms are as follows: (1) the isomerization of straight-chain paraffins to highly branched isomers, and (2) the cracking of such paraffins to isobutane as an end product. In the modern scheme of synthetic high-octane fuels both reactions are important. However, to obtain the most highly branched paraffins in reasonable yields, low reaction temperatures are required. At room temperature the reaction of aluminum halides with paraffins, using the usual promoting agents such as halogen acids, is too slow for practical purposes. The primary object of the invention herein is to provide a process of converting paraffins wherein the reaction rate is increased greatly as compared with prior practices, and particularly to provide an improved process of converting straight chain paraffins having four or more carbon atoms in the molecule to branched chain paraffins.

We have discovered that the nitro-paraffins are active promoters for the aluminum halide-paraffin reaction. These compounds are several fold more active than water or hydrochloric acid, promoters now used in practice, in promoting the aluminum halide - paraffin reaction. Typical nitroparaffins which may be employed as promoters are: nitromethane, nitroethane, 1-nitropropane, and 2-nitropropane.

The nitro-paraffins as promoters are employed in concentrations on the order of 0.5 to 4.0 mole per cent. The preferred concentrations are as follows: nitroparaffin, 2 mole %; aluminum halide, 11 mole %; paraffin, 87 mole %.

Ordinarily the reaction temperature will be within the range of —10° C. to the boiling point of the paraffin hydrocarbon to be converted. Temperatures considerably lower may be used as may also higher temperatures under some conditions. With the lower temperatures the speed of reaction is reduced. In order to obtain the highest concentrations of the more highly branched isomers, it is desirable to carry out the reaction at relatively low temperature.

As specific and representative illustrations of procedure the following examples are given:

Example I

The following amounts of materials were allowed to react in an autoclave for seven days at —8° C. with stirring: n-hexane, 1500 cc.; aluminum chloride, 200 g.; nitroethane, 20 cc. Thirty-nine per cent of the n-hexane was converted to branched chain paraffins, which had the following percentage composition as determined by fractionation:

| | Per cent |
|---|---|
| Isobutane | 20.4 |
| Isopentane | 17.7 |
| 2,2-dimethylbutane | 7.6 |
| 2,3-dimethylbutane | 6.2 |
| 2-methylpentane | 17.9 |
| 3-methylpentane | 6.4 |
| Higher boiling paraffins | 23.8 |

Example II

The following amounts of materials were allowed to react in an autoclave for seven days at —8° C. with stirring: n-heptane, 1700 cc.; aluminum chloride, 200 g.; 2-nitropropane, 21 cc. Twenty-six per cent of the n-heptane was converted to branched chain paraffins, which had the following percentage composition as determined by fractionating:

| | Per cent |
|---|---|
| Isobutane | 16.6 |
| Isopentane | 16.3 |
| 2,3-dimethylbutane | |
| 2-methylpentane | 11.9 |
| 3-methylpentane | |
| 2,2-dimethylpentane | |
| 2,4-dimethylpentane | 8.9 |
| 2,2,3-trimethylbutane | |
| 3,3-dimethylpentane | |
| 2-methylhexane | 20.0 |
| 3-methylhexane | |
| 2,3-dimethylpentane | |
| Higher boiling paraffins | 26.2 |

In comparison with the results given in Examples I and II, no reaction occurred with n-hexane and n-heptane and aluminum chloride when stirred for one week at —5° C. to +10° C. using an equivalent amount of water or hydrochloric acid rather than the nitro-paraffins as promoters.

In a manner generally similar to treatment of n-hexane and n-heptane, other paraffin hydrocarbons and in particular straight chain paraffin hydrocarbons having four or more carbon atoms in the molecule may be converted. Mixtures of the paraffin hydrocarbons may be treated in similar manner. Other aluminum halides such as aluminum bromide may be used in place of aluminum chloride. It is contemplated also that mixtures of the nitro-paraffins may be used as the promoter, if desired.

Various modifications and changes may be made without departing from the principles and spirit of our invention.

We claim:

1. The process of converting a paraffin hydrocarbon having at least four carbon atoms in the molecule to other forms of paraffinic hydrocarbons which includes, treating the paraffin hydrocarbon with an aluminum halide under isomerization conditions in the presence of a nitroparaffin as a promoter, said nitroparaffin being about 0.5 to 4 mole per cent of the reacting mixture.

2. The process of converting a straight-chain paraffin hydrocarbon having at least four carbon atoms in the molecule to branched-chain paraffinic hydrocarbons which includes, reacting the straight-chain paraffinic hydrocarbon with an aluminum halide in the presence of a nitro paraffin as a promoter, said promoter being about 0.5 to 4 mole per cent of the reacting mixture.

3. A process as in claim 2 in which the hydrocarbon is n-hexane.

4. A process as in claim 2 in which the paraffin hydrocarbon is n-heptane.

5. A process as in claim 2 in which the aluminum halide is aluminum chloride.

6. A process as in claim 2 in which the aluminum halide is aluminum bromide.

7. A process as in claim 2 in which the nitroparaffin is about 2 mole per cent.

8. A process as in claim 2 in which the aluminum halide is aluminum chloride (11 mole %), the nitroparaffin is nitroethane (2 mole %) and a reaction temperature of −8° C. is employed.

9. A process as in claim 2 in which the aluminum halide is aluminum chloride (11 mole %), the nitroparaffin is 2-nitropropane (2 mole %), and a reaction temperature of −8° C. is employed.

10. The process of converting a straight-chain paraffin-hydrocarbon having at least four carbon atoms in the molecule to branched-chain, paraffin-hydrocarbons which includes, reacting the straight-chain, paraffin-hydrocarbon at a temperature within the range of about −10° C. up to the boiling point of the straight-chain, paraffin-hydrocarbon with an aluminum halide in the presence of a nitroparaffin as a promoter, the promoter being .5 to 4 mole per cent of the reacting mixture.

11. The process of converting a straight-chain, paraffin-hydrocarbon having at least four carbon atoms in the molecule to branched-chain, paraffin-hydrocarbons which includes, reacting the straight-chain, paraffin-hydrocarbon at a temperature within the range of −10° C. up to the boiling point of the hydrocarbon to be converted with an aluminum halide in the presence of a nitroparaffin as a promoter, the concentrations of the components of the reaction mixture being substantially as follows: nitroparaffin, 2 mole %; aluminum halide, 11 mole %; and straight-chain, paraffin-hydrocarbon, 87 mole %.

PAUL L. CRAMER.
CHARLES R. BEGEMAN.